United States Patent [19]

Yasuoka

[11] Patent Number: 4,702,213
[45] Date of Patent: Oct. 27, 1987

[54] METHOD FOR CONTROLLING AIR/FUEL RATIO

[75] Inventor: Akimasa Yasuoka, Tokyo, Japan

[73] Assignee: Honda Giken Kogyo Kabushiki Kaisha, Tokyo, Japan

[21] Appl. No.: 813,501

[22] Filed: Dec. 26, 1985

[30] Foreign Application Priority Data

Dec. 25, 1984 [JP] Japan ................................ 59-271892

[51] Int. Cl.$^4$ ............................................ F02M 51/00
[52] U.S. Cl. .................................... 123/480; 123/486; 123/494
[58] Field of Search ............... 123/440, 478, 480, 486, 123/487, 489, 494; 364/431.05

[56] References Cited

U.S. PATENT DOCUMENTS

| | | | |
|---|---|---|---|
| 4,269,156 | 5/1981 | Drellishak | 123/478 |
| 4,404,946 | 9/1983 | Hoard et al. | 123/478 X |
| 4,509,485 | 4/1985 | Hasegawa | 123/440 |

Primary Examiner—Willis R. Wolfe, Jr.
Attorney, Agent, or Firm—Lyon & Lyon

[57] ABSTRACT

A fuel supply control method for an internal combustion engine. Sensors read out values for engine speed, intake pipe absolute pressure and exhaust passage absolute pressure. These values are used to determine a basic fuel supply value and a fuel supply correction value and these derived values are, in turn, used to determine the amount of fuel to be supplied to the engine.

8 Claims, 5 Drawing Figures

| Ne\PBA | PBA1 | PBA2 | --- | PBAj | --- | PBA9 |
|---|---|---|---|---|---|---|
| Ne1 | Ti1.1 | Ti1.2 | | | | |
| Ne2 | Ti2.1 | Ti2.2 | | | | |
| ⋮ | | | | | | |
| Nei | | | | Tiij | | |
| ⋮ | | | | | | |
| Ne9 | | | | | | Ti9.9 |

| Ne\PBA | PBA1 | PBA2 | --- | PBAj | --- | PBA9 |
|---|---|---|---|---|---|---|
| Ne1 | PEXS1.1 | PEXS1.2 | | | | |
| Ne2 | PEXS2.1 | PEXS2.2 | | | | |
| ⋮ | | | | | | |
| Nei | | | | PEXSi.j | | |
| ⋮ | | | | | | |
| Ne9 | | | | | | PEXS9.9 |

METHOD FOR CONTROLLING AIR/FUEL RATIO

BACKGROUND OF THE INVENTION

The field of the present invention is air/fuel control systems for internal combustion engines.

Various methods for controlling air/fuel mixtures in fuel injection type internal combustion engines have been proposed. Generally, air/fuel mixtures are controlled by regulation of the opening time of a fuel injection device. The opening time is usually determined by multiplying a reference value, $T_i$, by various correction coefficients which are determined according to operating conditions. The reference value, $T_i$, is read out from a basic $T_i$ map according to detected values of absolute pressure in the intake passage of the engine and the engine speed.

However, in an internal combustion engine, especially one with a supercharger, a back pressure is often generated which can affect the amount of air which enters the combustion chamber and thus the air/fuel ratio. When an engine with a supercharger is accelerating or decelerating, the back pressure varies greatly due to the inertia of the supercharger. Therefore, the optimum amount of fuel or air to be supplied cannot be determined with only the intake pipe absolute pressure and the engine speed.

A supercharger is a unit for pre-compressing intake air or air/fuel mixture. The supercharger makes use of the pressure generated by gases in the exhaust passage to turn an exhaust turbine which drives a compressor in the intake passage. During acceleration of the engine, the inertia of the exhaust turbine causes a delay in its increase of rotation, causing the engine back pressure to become higher than it would be during normal operation (that is, when the engine is not accelerating or decelerating). As a result, the amount of air introduced into the combustion chamber is lower during acceleration than it would be during normal operation. Therefore, if the same amount of fuel is supplied as is provided during normal operation, the air/fuel mixture becomes overrich, resulting in an increase of fuel consumption, deterioration of exhaust gas characteristics and reduction of engine output. On the other hand, during deceleration the inertia of the supercharger turbine causes a delay in its decrease of rotation, resulting in a back pressure which is lower than that of normal operation and thus a higher amount of air introduction. Therefore, if the normal amount of fuel is supplied, the air/fuel mixture becomes overlean, causing engine performance to deteriorate.

One example of a method for controlling the air/fuel mixture of an internal combustion engine is found in U.S. Pat. No. 4,509,485.

SUMMARY OF THE INVENTION

The present invention is directed to a method for controlling air/fuel mixture in an internal combustion engine with a supercharger so the drivability of the engine might be enhanced, especially when the engine is in a state of acceleration or deceleration. The present invention accomplishes this result by first detecting an engine load and an exhaust gas pressure. The process then determines a basic control amount of, for example, fuel or air in accordance with the detected engine load and a corrected control amount in accordance with the detected exhaust gas pressure. Finally, the engine is supplied with an operational control amount of, for example, fuel or air in accordance with the basic control amount and the corrected control amount. Accordingly, it is an advantage of the present invention to provide an air/fuel mixture which improves the drivability of the engine. Other and further advantages will appear hereinafter.

DETAILED DESCRIPTION OF THE PREFERRED EMBODIMENT

Figure 1:
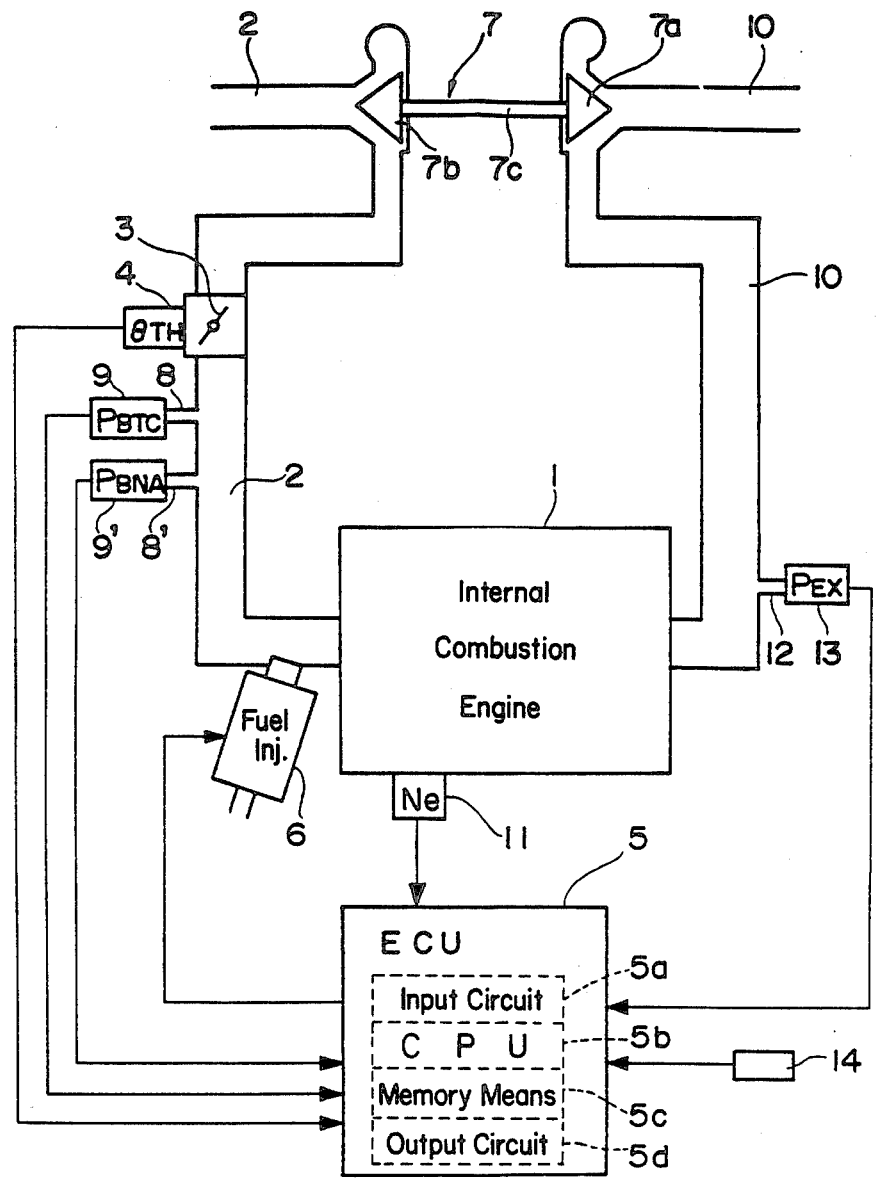
FIG. 1 is a block diagram of a fuel supply system to which the method of the present invention may be applied.

Referring now to the block diagram of a fuel supply controlling system shown in FIG. 1, an intake pipe 2 is connected to an internal combustion engine 1 of, for example, four cylinders. Further, a throttle valve 3 is provided at about the halfway point of the intake pipe 2 and a throttle valve opening ($\theta$TH) sensor 4 is attached to the throttle valve 3. The sensor 4 converts a valve opening of the throttle valve 3 into an electrical signal and sends the signal to an electronic control unit (hereinafter referred to as "ECU") 5. Also, a fuel injection valve 6 is attached to the intake pipe 2 and is connected electrically to the ECU 5 so that the valve opening time for fuel injection is controlled in accordance with a signal provided from the ECU 5.

In an exhaust pipe 10 of the engine 1 is a turbine 7a of a supercharger 7. The turbine 7a rotates because of the exhaust gas pressure from the engine 1. The rotation of the turbine is imparted to a compressor 7b by a rotating shaft 7c. The compressor 7b is located upstream of the throttle valve 3.

Downstream of the throttle valve 3 are located an absolute pressure ($P_{BTC}$) sensor 9 and an absolute pressure ($P_{BNA}$) sensor 9', which detect intake passage pressure through pipes 8 and 8', respectively. The absolute pressure ($P_{BTC}$) sensor 9 and absolute pressure ($P_{BNA}$) sensor 9' are provided respectively for supercharging pressure (high pressure) measurement and for low pressure measurement in order to measure an internal pressure of the intake pipe accurately. The pressure of intake air varies over a wide range due to the provision of the supercharger 7 for the engine 1. The sensors 9 and 9' each provide a signal to the ECU 5, which indicates absolute pressure in the intake pipe.

In the body of the engine 1 an engine speed (Ne) sensor 11 is mounted around a cam shaft or crank shaft (not shown) of the engine. The engine speed sensor 11 outputs a crank angle position signal (hereinafter referred to as "TDC signal") in a predetermined crank angle position at every 180° rotation of the engine crank shaft. The TDC signal is generated at a crank angle position which corresponds to top dead center (TDC) of the piston at the starting time of the intake stroke in each cylinder. This TDC signal is sent to the ECU 5.

An exhaust gas pressure ($P_{EX}$) sensor 13 is connected to the exhaust pipe 10 through a pipe 12 and provides an exhaust gas pressure signal to the ECU 5.

The ECU 5 is connected to other engine operation parameter sensors 14 such as, for example, an engine water temperature sensor and an atmospheric pressure sensor. The other parameter sensors 14 provide detected signals to the ECU 5.

The ECU 5 includes an input circuit 5a which functions to effect waveform shaping for some of the input signals received from various sensors, correct the voltage level of the other input signals into a predetermined level or convert analog signal values to digital signal values. The ECU also includes a central processing unit (hereinafter referred to as "CPU") 5b, a memory means 5c which stores various operation programs to be executed in the CPU 5b and also stores operation results and an output circuit 5d which provides a driving signal to the fuel injection valve 6.

The CPU 5b calculates an opening time $T_{OUT}$ for the fuel injection valve 6 on the basis of engine operation parameter signals provided from the various sensors through the input circuit 5a and executes a program shown in terms of a flowchart in FIG. 2 as will be described hereinafter.

Figure 2:
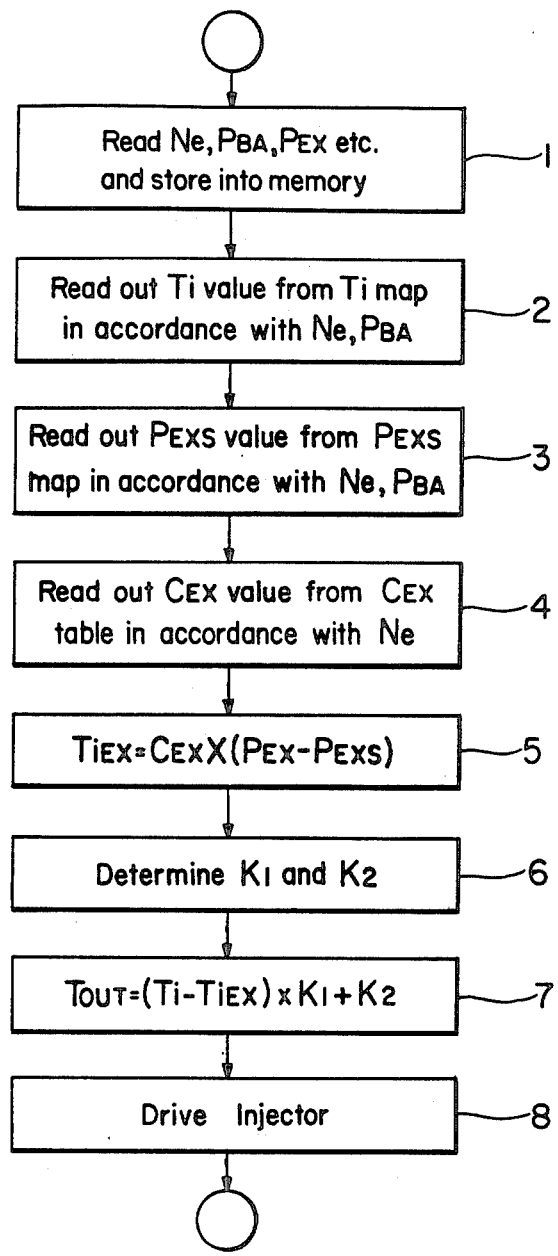
FIG. 2 is a flowchart of one embodiment of the present invention.

FIG. 2 shows a flowchart of a program according to the method of the invention used when control is made by the ECU 5 for the opening time of the fuel injection valve 6. This program is executed at every generation of the TDC signal by the Ne sensor 11.

According to step 1 of the method, an engine speed value NE, an intra-intake pipe absolute pressure $P_{BA}$ and an exhaust gas pressure value $P_{EX}$, detected by the engine speed sensor 11, absolute pressure sensors 9, 9' and exhaust gas pressure sensor 13, respectively, are input to the ECU 5 and stored in the memory means 5c.

Figures 3, 4, 5:
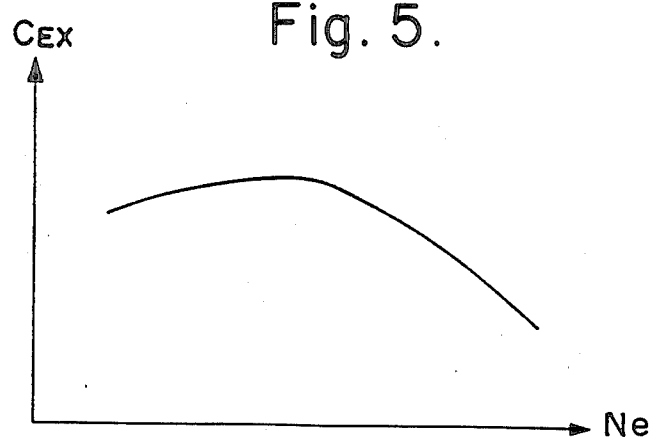
FIG. 3 is a reference basic valve opening $T_i$ map depicting $T_i$ as a function of intake passage absolute pressure and engine speed.
FIG. 4 is a reference exhaust gas pressure $P_{EXS}$ map depicting $P_{EXS}$ as a function of intake pipe absolute pressure and engine speed.
FIG. 5 is a graph depicting the back pressure correction coefficient as a function of engine speed.

In step 2, a reference valve opening time $T_i$ according to engine operation parameters which represent an engine load, for example, engine speed Ne and intra-intake pipe absolute pressure $P_{BA}$, is read out from a $T_i$ map as shown in FIG. 3.

In step 3, a reference exhaust gas pressure value $P_{EXS}$, according to the engine speed Ne and absolute pressure value $P_{BA}$, is read out from a $P_{EXS}$, map as shown in FIG. 4. The reference values $P_{EXS}$, shown in this $P_{EXS}$ map represent exhaust gas pressure values in a state of normal operation which are preset by experiment as a function of engine speed values Ne and absolute pressure values $P_{BA}$. Next, a back pressure correction coefficient $C_{EX}$ according to engine speed Ne is read out from a $C_{EX}$ table as shown in FIG. 5. The correction coefficient $C_{EX}$ at each engine speed value Ne is calculated by the following equation:

$$C_{EX} = \frac{T_i}{P_{BA}} AVE \times \frac{T_A}{T_{EX}} \times \frac{1}{\epsilon} \quad (1)$$

where,
$(T_i/P_{BA})AVE$ = a mean value of the ratio of the reference valve opening time $T_i$ to the absolute pressure value $P_{BA}$
$T_A$ = intake air temperature
$T_A$ = intake air temperature
$T_{EX}$ = exhaust gas temperature
$\epsilon$ = engine compression ratio As to $T_A$ and $T_{EX}$, their representative values are preset by experiment. In the case where an intake air temperature sensor and an exhaust gas temperature sensor are attached to the engine, the correction coefficient $C_{EX}$ may be determined on the basis of detected values provided from those sensors in accordance with the above equation (1).

According to step 5, an amount of fuel corresponding to a variation in the amount of fresh air introduced into the combustion chamber during acceleration or deceleration from that in normal operation is calculated. This variation is caused by a change in back pressure in transitional operation from that in normal operation. A back pressure-corrected valve opening time, $T_{iEX}$, is calculated by the following equation:

$$T_{iEX} = C_{EX} \times (P_{EX} - P_{EXS}) \quad (2)$$

where,
$C_{EX}$ = back pressure correction coefficient determined in step 4
$P_{EX}$ = detected value of exhaust gas pressure which was input and stored in step 1
$P_{EXS}$ = reference value of exhaust gas pressure determined in step 3

In accordance with the equation (2), during acceleration when the exhaust gas pressure rises, the $T_{iEX}$ value becomes a value of positive sign because the detected value $P_{EX}$ becomes larger than the reference value $P_{EXS}$. It becomes a value negative sign during deceleration when the exhaust gas pressure $P_{EX}$ drops.

In step 6, a correction coefficient $K_1$ and a correction variable $K_2$ are determined according to the foregoing engine operation parameter signals provided from various sensors. The coefficient $K_1$ and the variable $K_2$ are calculated on the basis of predetermined arithmetic expressions so as to afford optimum fuel consumption and exhaust gas characteristics according to operating conditions of the engine.

Then the program advances to step 7, in which an opening time $T_{OUT}$ of the fuel injection valve 6 is calculated by the following equation:

$$T_{OUT} = (T_i - T_{iEX}) \times K_1 + K_2$$

Finally, in accordance with the valve opening time T thus determined, the output circuit 5d in the ECU 5 provides a driving signal to the fuel injection valve 6 to control its opening time.

Although in this embodiment the operational control amount as expressed by $T_{OUT}$ was assumed to be the amount of fuel to be supplied, this is not intended as a limitation. For example, the operational control amount may be the amount of intake air.

Thus, a method of controlling air/fuel mixture is disclosed which improves the drivability of the engine, especially during periods of acceleration and deceleration. While embodiments and applications of this invention have been disclosed and described, it would be apparent to those skilled in the art that many more modifications are possible without departing from the inventive concepts herein. The invention, therefore, is not to be restricted except in the spirit of the appended claims.

What is claimed is:

1. A method for controlling an operational control amount for an internal combustion engine having a supercharger, an intake passage and an exhaust passage, comprising, detecting an engine speed, detecting an intake absolute pressure in the intake passage of the engine, detecting an exhaust gas pressure in the exhaust passage of the engine, determining a normal control amount in accordance with said engine speed and said intake absolute pressure, determining a reference exhaust value in accordance with said engine speed and said intake absolute pressure, determining a correction coefficient in accordance with said engine speed, determining a correction control amount according to the following formula:

$$T_{iEX} = C_{EX} \times (P_{EX} - P_{EXS})$$

where, $T_{iEX}$ = said correction control amount
$C_{EX}$ = said correction coefficient
$P_{EX}$ = said exhaust gas pressure
$P_{EXS}$ = said reference exhaust gas value, determining the operational control amount in accordance with said normal control amount amount and said correction control amount, controlling an air/fuel ratio of the engine with the operational control amount.

2. A method for controlling an operational control amount of fuel for an internal combustion engine having a supercharger and exhaust passage, comprising, detecting an engine load, detecting an exhaust gas pressure in the exhaust passage of the engine, determining a basic control amount in accordance with said engine load, determining a correcting control amount in accordance with said exhaust gas pressure, determining the operational control amount of fuel to be supplied to the engine in accordance with the difference between said correcting control amount and said basic control amount, and controlling an air/fuel ratio of the engine with the operational control amount of fuel.

3. A fuel supply controlling method for an internal combustion engine having a supercharger for controlling the amount of fuel to be supplied to the engine according to operating conditions of the engine, which method comprises detecting an engine load, detecting an exhaust gas pressure, determining a basic amount of fuel in a state of normal operation of the engine in accordance with the detected value of engine load, determining a correcting amount of fuel in accordance with the detected value of exhaust gas pressure, correcting said basic amount of fuel with said correcting amount of fuel, and supplying to the engine an amount of fuel determined on the basis of the thus-corrected basic amount of fuel thereby controlling the amount of fuel supplied to the engine.

4. A method for controlling an operational control amount for an internal combustion engine having a supercharger and an exhaust passage, comprising, detecting an engine load, detecting an engine speed, detecting an exhaust gas pressure in the exhaust passage of the engine, detecting a basic control amount in accordance with said engine load, determining a correcting control amount in accordance with said exhaust gas pressure and said engine speed, determining the operational control amount in accordance with said basic control amount and said correcting control amount, and controlling an air/fuel ratio of the engine with the operational control amount.

5. A method for controlling an operational control amount for an internal combustion engine having a supercharger and an exhaust passage, comprising, detecting an engine load, detecting an exhaust gas pressure in the exhaust passage of the engine, determining a basic control amount in accordance with said engine load, determining a correcting control amount in accordance with a difference between said exhaust gas pressure and a reference exhaust gas correcting amount of pressure, said reference exhaust gas correcting amount of pressure being determined in accordance with a detected value of a predetermined operation parameter in normal operation of the engine, determining the operational control amount to be supplied to the engine in accordance with said basic control amount and said correcting control amount, and controlling an air/fuel ratio of the engine with the operational control amount supplied to the engine.

6. The method of claim 1, wherein said predetermined operation parameter is an engine load.

7. The method of claim 1, wherein said engine load is detected at least from an absolute pressure in an intake passage of the engine.

8. The method of claim 1, wherein said correcting control amount is determined further in accordance with an engine speed.

* * * * *